US012643382B2

(12) United States Patent
Wüllrich et al.

(10) Patent No.: US 12,643,382 B2
(45) Date of Patent: Jun. 2, 2026

(54) CONVERTIBLE ARRANGEMENT HAVING A CONVERTIBLE TOP BOX LID ARRANGEMENT

(71) Applicant: Webasto SE, Stockdorf (DE)

(72) Inventors: Heinrich Wüllrich, Stockdorf (DE); Alexander Haimerl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 380 days.

(21) Appl. No.: 18/519,647

(22) Filed: Nov. 27, 2023

(65) Prior Publication Data

US 2024/0174066 A1 May 30, 2024

(30) Foreign Application Priority Data

Nov. 29, 2022 (DE) ...................... 10 2022 131 517.7

(51) Int. Cl.
B60J 7/00 (2006.01)
B60J 7/20 (2006.01)

(52) U.S. Cl.
CPC ..................................... B60J 7/205 (2013.01)

(58) Field of Classification Search
CPC ..... B60J 7/20; B60J 7/201; B60J 7/205; B60J 7/208
USPC .................................................. 296/107.08
See application file for complete search history.

(56) References Cited

U.S. PATENT DOCUMENTS

| | | | |
|---|---|---|---|
| 6,193,300 B1 * | 2/2001 | Nakatomi | B60J 7/205 296/76 |
| 10,766,344 B2 * | 9/2020 | Wüllrich | B60J 10/90 |
| 2010/0201150 A1 * | 8/2010 | Kinnanen | B60J 7/205 296/107.08 |
| 2017/0001500 A1 * | 1/2017 | Kopp | B60J 7/202 |

FOREIGN PATENT DOCUMENTS

| | | |
|---|---|---|
| DE | 19946454 A1 | 4/2000 |
| DE | 102017121577 B4 | 12/2019 |

OTHER PUBLICATIONS

Office Action issued in corresponding German Application No. 10 2022 131 517.7; mailed Dec. 13, 2023 in German with English Machine Translation (10 pages).

* cited by examiner

Primary Examiner — Steven O Douglas
(74) Attorney, Agent, or Firm — Fitch, Even, Tabin & Flannery, LLP

(57) ABSTRACT

A convertible arrangement having a convertible top box lid arrangement, which has a lid element, a support frame on which the lid element is mounted, and a kinematics unit on each of both sides with respect to a vertical longitudinal lid center plane, the kinematics unit pivoting the lid element together with the support frame between a closed position closing a convertible top storage space and an open position exposing the convertible top storage space. The kinematics units each have an adjustment-link arrangement, which is driven by a drive element, and a seven-joint-linkage arrangement, which has two supporting links, which articulate with a support bearing attached to the vehicle, and two guiding control links, which articulate with the support frame.

7 Claims, 6 Drawing Sheets

CONVERTIBLE ARRANGEMENT HAVING A CONVERTIBLE TOP BOX LID ARRANGEMENT

CROSS-REFERENCE TO RELATED APPLICATION

This application claims priority from German Patent Application Number 10 2022 131 517.7, filed on Nov. 29, 2022, which is hereby incorporated herein by reference in its entirety for all purposes.

FIELD

The invention relates to a convertible arrangement having the features of the preamble of claim 1.

BACKGROUND

A convertible arrangement of this kind is known from practice and is a component of a convertible vehicle comprising a displaceable convertible top, which is realized as a folding roof having a foldable convertible top cover or as an RHT (retractable hard top) and which is displaceable between a cover position spanning a vehicle interior and a storage position exposing the vehicle interior towards the top, the convertible top being received in a convertible top storage space of the convertible arrangement when in the storage position. The convertible top storage space is equipped with a convertible top box lid arrangement provided with a lid element which represents the actual closing element and is mounted on a support frame. For displacing the lid element, the convertible top box lid arrangement has a kinematics unit on each of both sides with respect to a vertical longitudinal lid center plane. By actuating the kinematics units, the lid element together with the support frame can be pivoted between a closed position closing the convertible top storage space and an open position exposing the convertible top storage space. In the open position, the displaceable convertible top of the convertible arrangement can be retracted to the convertible top storage space or be extracted from the convertible top storage space. Furthermore, it is known that the lid element can be pivoted in the manner of a trunk lid with respect to the support frame in order for the convertible top storage space to be used as a stowing space. The problem with the convertible top box lid arrangements of the known convertible arrangement is that the lid element does not execute a sufficient lifting movement when pivoted to the open position, meaning the freedom degrees are limited when designing the displaceable convertible top. Moreover, the support frame is configured such that it is disposed above the convertible top elements in the case of a convertible top stored in the convertible top storage space. In the storage position of the convertible top, the convertible top storage space can therefore only be used as additional stowing space for luggage or the like at considerable effort, as the lid element together with the support frame has to be lifted for a slight lifting of the convertible top. In addition, the closures for the use of the lid element as a trunk lid are disposed on both sides in the area of support elements extending in the longitudinal direction, the support elements being connected to each other via the lid element and forming a support frame in the broadest sense.

SUMMARY

The object of the invention is therefore to create a convertible arrangement which is designed according to the type mentioned above and in which the convertible top box lid arrangement is designed such that the lid element is lifted as much as possible upon its displacement between the closed position and the open position and is displaced as little as possible in the longitudinal vehicle direction.

According to the invention, this object is attained by the convertible top arrangement having the features of claim 1.

According to the invention, a convertible arrangement is proposed which comprises a convertible top box lid arrangement, which in turn comprises a lid element, a support frame on which the lid element is mounted, and a kinematics unit on each of both sides with respect to a vertical longitudinal lid center plane, the kinematics unit pivoting the lid element together with the support frame between a closed position closing a convertible top storage space and an open position exposing the convertible top storage space. The kinematics units each comprise an adjustment-link arrangement, which is driven by a drive element, and a seven-joint-linkage arrangement, which can also be a six-bar-linkage arrangement and comprises two supporting links, which articulate with a support bearing attached to the vehicle, and two guiding control links, which articulate with the support frame. The adjustment-link arrangement, on which the drive element acts, initiates the displacement process and introduces the drive forces to the unit made of the lid element and the support frame. This unit is pivoted at the seven-joint-linkage arrangement, which introduces a lifting movement or a lowering movement to the unit made of the lid element and the support frame using the two supporting links and the guide control links depending on the movement direction owing to its design. The seven-joint-linkage arrangement can be configured in particular such that it requires only a small installation space in the longitudinal vehicle direction, meaning the lid element follows the desired movement trajectory even when little installation space is available, such as between a wheel house and a backlight installation of the corresponding vehicle. With respect to a vertical projection, the seven-joint-linkage arrangement also allows the support frame to lie outside of the area in which the convertible top of the corresponding convertible vehicle is disposed in its storage position in the convertible top storage space. This allows lifting the convertible top in such a manner with little effort when using the lid element as a trunk lid that the convertible top storage space can also be loaded with additional objects even when the convertible top is in storage. A loading aid can thus be easily realized, without the lid element together with the support frame having to be lifted for this purpose.

In a preferred embodiment of the convertible arrangement according to the invention, the support frame comprises two longitudinal legs and one transverse leg connecting the two longitudinal legs, the seven-joint-linkage arrangements each articulating with one of the longitudinal legs. The seven-joint-linkage arrangements can be disposed far outside of the convertible top box lid arrangement with respect to the vertical longitudinal center plane, whereby it can be prevented that a loading bottom, which forms a lower limit surface of the convertible top storage space, has an opening to the passage of the longitudinal legs and/or that a covering element or the like has to be guided along when displacing the lid element.

In a special embodiment of the convertible arrangement according to the invention, the longitudinal legs of the support frame are each guided laterally beside the loading bottom downward towards the corresponding seven-joint-linkage arrangement. The support frame elements are therefore disposed so far on the outside that they lie outside of a movement trajectory which follows the convertible top when it is slightly lifted from the storage position when loading or unloading the convertible top storage space used as a stowing space.

The lid element of the convertible arrangement according to the invention is therefore preferably pivotable to a loading position from the closed position with respect to the support frame, objects being able to be introduced in the stowing space, which is below the stored convertible top, when in the loading position. In order to secure the lid element with respect to the support frame, a trunk lock is preferably provided which is disposed, in particular centrally, at the transverse leg of the support frame. Complex locking arrangements for the use of the lid element as a trunk lid, which would be disposed in the area of the longitudinal legs of the support frame, are consequently not required.

The adjustment-link arrangements, which each preferably articulate with a main bearing attached to the vehicle, on the one hand, and to the support frame, on the other hand, are each designed as an articulated-lever arrangement made of two interconnected links in a functional embodiment of the convertible arrangement according to the invention. The first link articulates with the corresponding main bearing attached to the vehicle and is preferably the link driven by the drive element. The second link, which articulates with the first link, is connected to the support frame. The drive element is, for example, a hydraulically driven drive cylinder, which drives a drive link articulating with the first link of the articulated-lever arrangement, or even an electric motor, which drives the first link via a drive link and/or a gear.

In order to keep the number of the drive elements of the convertible arrangement according to the invention low, the drive element, which drives a lid element, preferably drives an additional lid closure which secures the support frame in the closed position in a locked position and allows a pivoting of the lid element and the support frame to the open position when in an exposed position.

Further advantages and advantageous embodiments of the subject matter of the invention can be derived from the description, the drawing and the claims.

BRIEF DESCRIPTIONS OF THE DRAWINGS

An exemplary embodiment of a convertible arrangement according to the invention is shown in a schematically simplified manner and is described in further detail in the following description.

DETAILED DESCRIPTION

Figure 1:
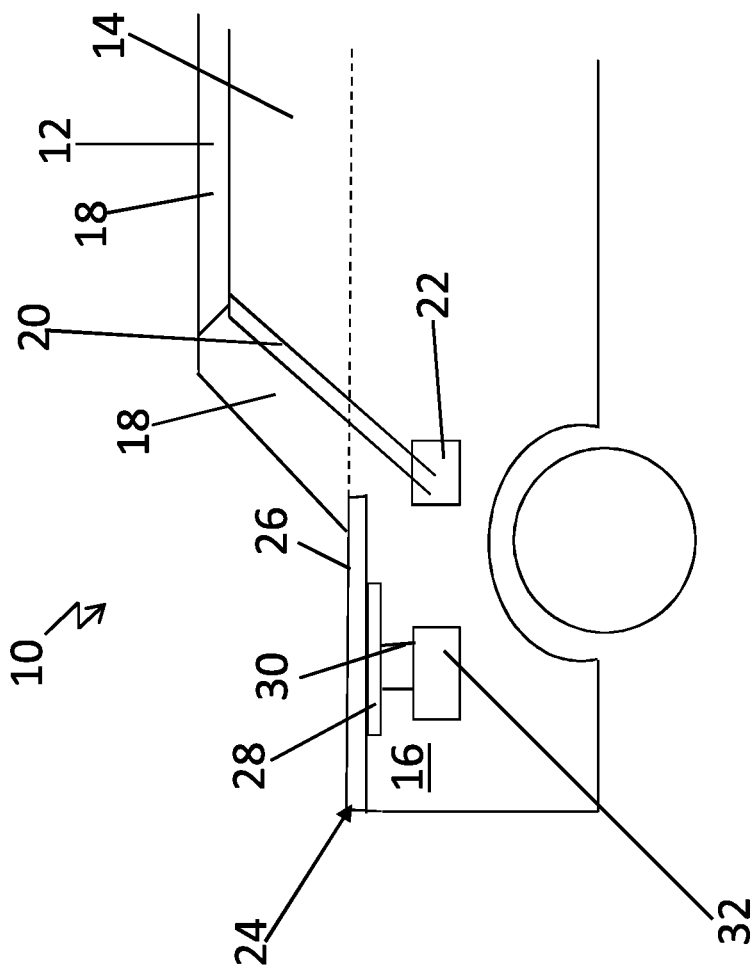
FIG. 1 shows a schematic lateral view of a rear area of a convertible vehicle having a convertible top arrangement according to the invention.
Figure 2:
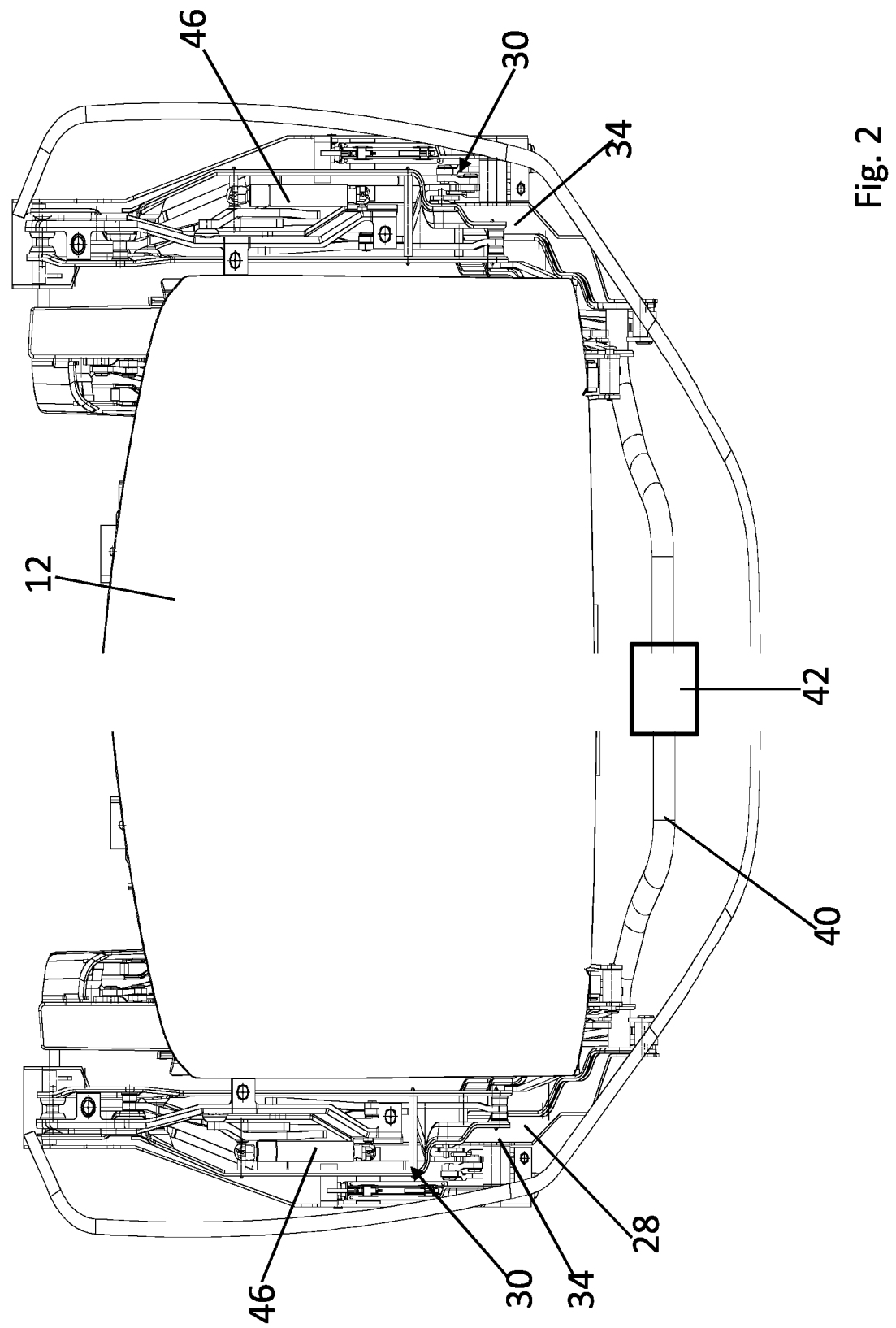
FIG. 2 shows a schematic top view of displacement kinematics of a convertible top box lid arrangement of the convertible arrangement.
Figure 9:
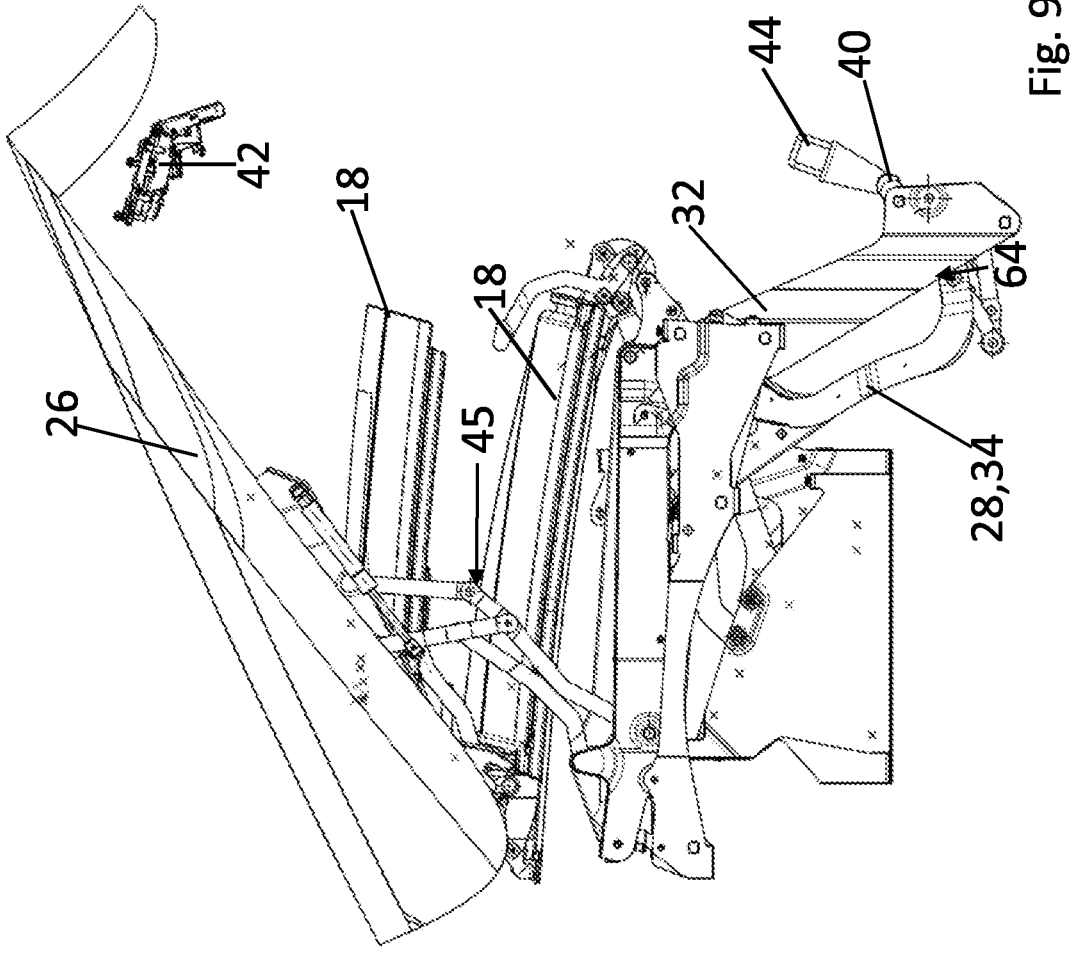
FIG. 9 shows a lateral view of the convertible top box lid arrangement in a loading position of the lid element when the convertible top is stored.

In FIG. 1, a convertible vehicle 10 is shown which is equipped with a convertible top 12, which is designed as a displaceable roof and is displaceable between a covering position (shown in FIG. 1) spanning a vehicle interior 14 and a storage position (shown in FIG. 9), in which it is received by a convertible top storage space 16 of convertible vehicle 10 and vehicle interior 14 is exposed to the top. In the present instance, convertible top 12 is realized as an RHT (retractable hard top), which comprises several rigid roof shells 18 disposed superjacent on each other in convertible top storage space 16 when in the storage position. It is also conceivable, however, to realize the convertible top as a folding roof, which comprises a spannable convertible top cover, or as a panel bow convertible top, which has a spannable convertible top cover supported by planar, adjacent panel bows and/or transverse bows when in the covering position.

For actuation, convertible top 12 has a convertible-top linkage 20, which is essentially mirror-symmetrical with respect to a vertical longitudinal convertible top center plane and has a link arrangement on each of both sides, the link arrangement being pivotally mounted on a main bearing 22 attached to the chassis.

Figures 5, 6:
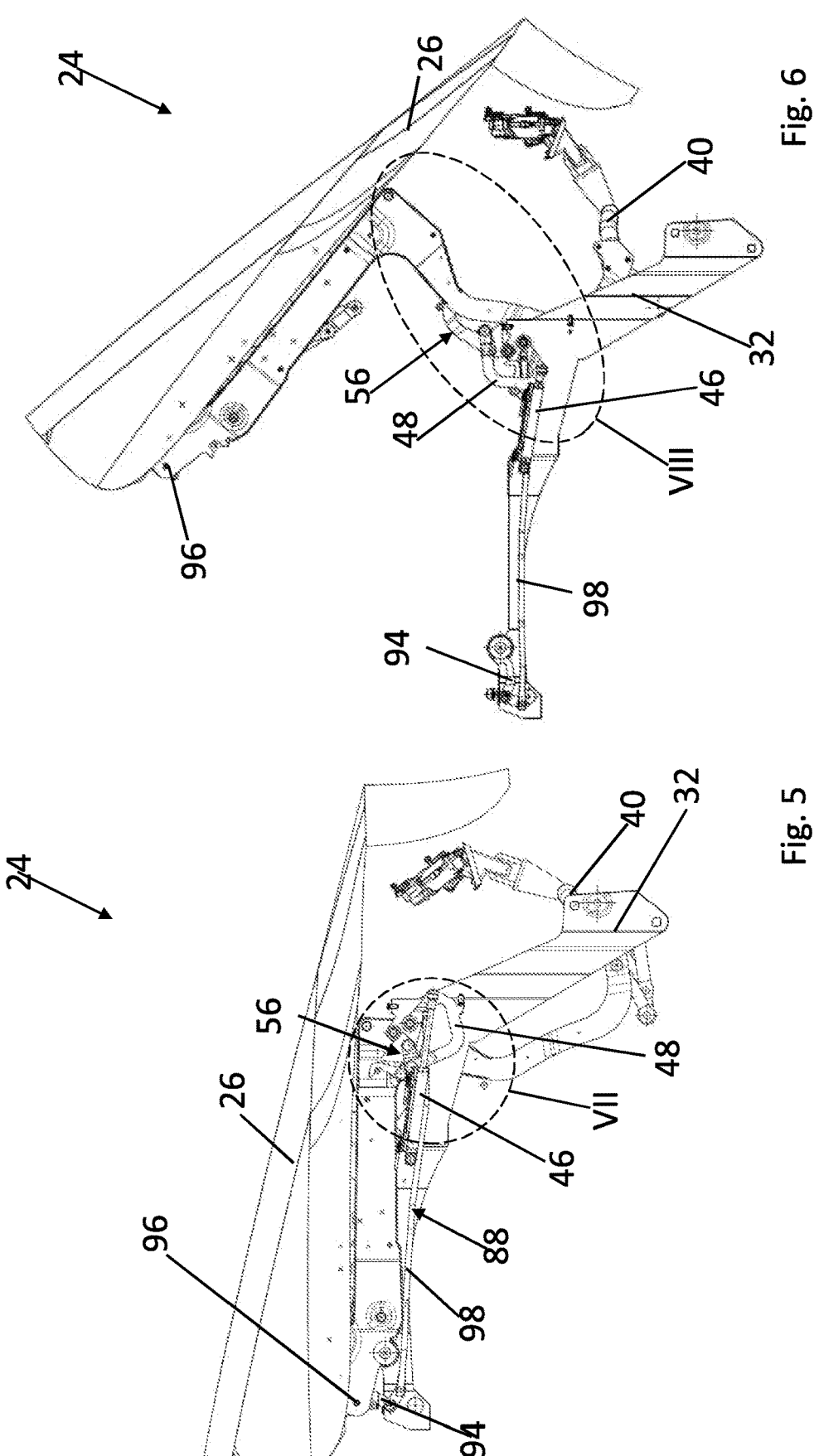
FIG. 5 shows a lateral view of a kinematics unit of the convertible top box lid arrangement in the closed position of the lid element.
FIG. 6 shows a view corresponding to FIG. 5 of the convertible top box lid arrangement, though in an open position of the lid element.
Figures 7, 8:
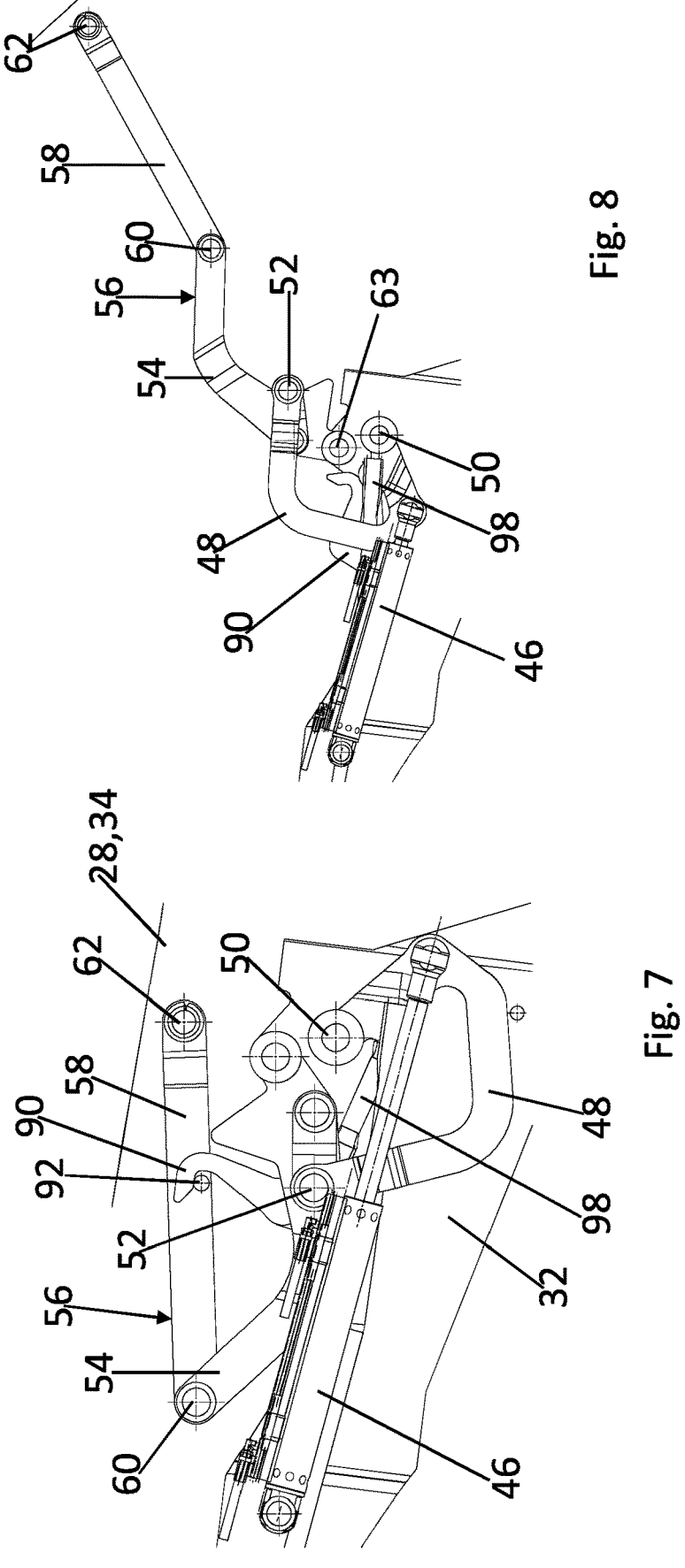
FIG. 7 shows an enlarged view of area VII in FIG. 5.
FIG. 8 shows an enlarged view of area VIII in FIG. 6.

The convertible top arrangement, which comprises convertible top 12 and convertible top storage space 16, further has a convertible top box lid arrangement 24 comprising a lid element 26, which is displaceable between a closed position (shown in FIGS. 1, 3 and 5), in which convertible top storage space 16 is closed, and an open position (shown in FIGS. 4 and 6), in which convertible top 12 can be moved from its cover position to its storage position in convertible top storage space 16 or from its cover position to the cover position.

Convertible top box lid arrangement 24 comprises a support frame 28, to which lid element 26 is rigidly fixed, and a kinematics unit 30 and a vehicle-fixed main bearing 28 on both sides with respect to a vertical longitudinal lid center plane and/or a longitudinal convertible top center plane. Kinematics units 30 each support themselves on corresponding main bearing 32 and act on support frame 28 of lid element 26.

With respect to the vertical longitudinal lid center plane, support frame 28 of lid element 26 comprises a longitudinal leg 34 on each of both sides, longitudinal legs 34 each comprising a support section 36, on which lid element 26 rests, and an adjustment section 38, which extends downward like a swan neck at the rear end of support section 36 and at which corresponding kinematics unit 30 abuts. Longitudinal legs 34 are connected to each other at their lower and/or rear end areas via a transverse leg 40. In the area of the longitudinal lid center plane of the convertible top box lid arrangement, a trunk lock 42, which interacts with a lock counter element 44 disposed on lid element 26, is disposed at transverse leg 40.

If trunk lock 42 releases lock counter element 44, lid element 26 can be pivoted in the manner of a trunk lid between the closed position and a loading position (shown in FIG. 9) in order for convertible top storage space 16 to be used as stowing space for luggage or the like. In the loading position, roof shells 18 of convertible top 12 can take up a position which is lifted with respect to the storage position, meaning the luggage and/or the objects can be pushed below roof shells 18 in the free stowage space.

Kinematics units 30, by means of which lid element 26 together with support frame 28 is displaceable between the closed position and the open position, each have a drive cylinder 46, which acts on a drive link 48 pivotally mounted at main bearing 32 in a pivoting point 50 and connected to a first link 54 of an articulated-lever arrangement 56 in a pivoting point 52, articulated-lever arrangement 56 additionally having a second link 58, which is connected to first link 54 in a pivoting point 60, on the one hand, and to corresponding longitudinal leg 34 of support frame 28 for lid element 26, on the other hand. First link 54 articulates with main bearing 32 in a pivoting point 63.

Moreover, kinematics units 30 each have a seven-joint-linkage arrangement 64, via which corresponding longitudinal leg 34 of support frame 28 supports itself on main bearing 32, which represents a support bearing, in a rear area of adjustment section 36 and which comprises two supporting links 66 and 68, which articulate with main bearing 32 in pivoting points 70 and 72, and two guiding control links 74 and 76, which articulate with longitudinal legs 34 of support frame 28 in pivoting points 78 and 80. For forming the seven-joint-linkage arrangement, guiding control link 74 is connected to supporting link 66 in a pivoting point 82 and connected to supporting link 68 in a pivoting point 84, and guiding control link 76 is connected to supporting link 68 in a pivoting point 86.

Figures 3, 4:
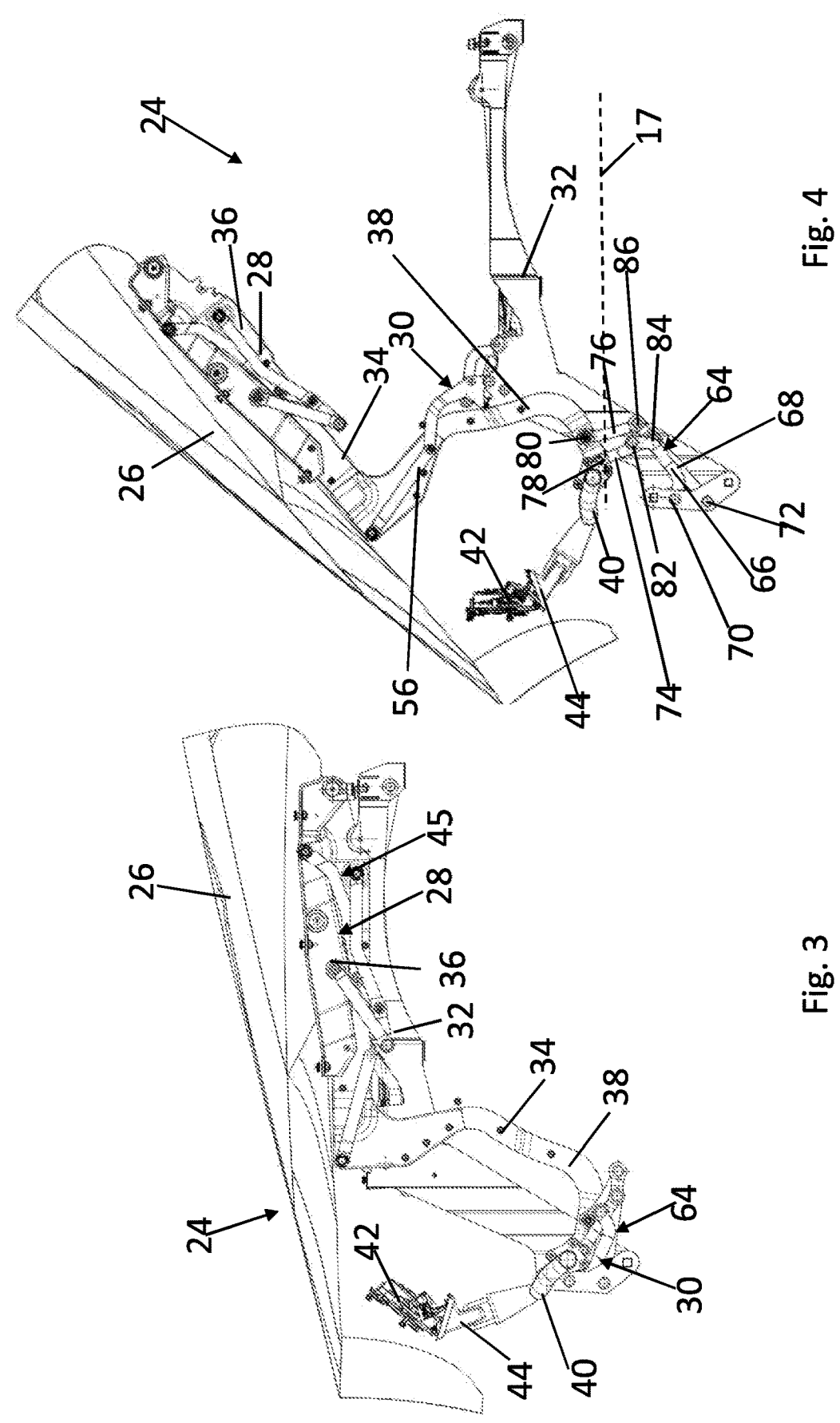
FIG. 3 shows an internal view of the convertible top box lid arrangement in a closed position of a lid element.
FIG. 4 shows a view corresponding to FIG. 3 of the convertible top box lid arrangement, though in a closed position of the lid element.

In a projection in the vehicle height, longitudinal legs 34 and kinematics units 30 each lie laterally adjacent to a loading bottom 17, which forms a lower limit of convertible top storage space 16. Moreover, seven-joint-linkage arrangements 64 and connected areas of adjustment sections 38 of longitudinal legs 34 of support frame 28 lie below the level of loading bottom 17. Accordingly, transverse leg 40, as shown in FIGS. 3 and 4, lies below the level of loading bottom 17.

Convertible top box lid arrangement 24 is equipped with a lid closure 88 on each of both sides with respect to the longitudinal lid center plane, lid closure 88 comprising a rear closing hook 90, which interacts with a closing bolt 92 formed at link 58 of articulated-lever arrangement 56, and a front closing hook 94, which interacts with a closing bolt 96 disposed at corresponding longitudinal leg 34 of support frame 28. Closing hooks 90 and 94 are each displaceable via a displacement linkage 98 by means of corresponding drive cylinder 46.

The invention claimed is:

1. A convertible arrangement, comprising:
a convertible top box lid arrangement which comprises
a lid element,
a support frame on which the lid element is mounted, and
a kinematics unit on each of both sides with respect to a vertical longitudinal lid center plane,
the kinematics unit pivoting the lid element together with the support frame between a closed position closing a convertible top storage space and an open position exposing the convertible top storage space,
wherein the kinematics units each comprise an adjustment-link arrangement, which is driven by a drive element, and a seven-joint-linkage arrangement, which comprises two supporting links, which articulate with a support bearing attached to a vehicle, and two guiding control links, which articulate with the support frame.

2. The convertible arrangement according to claim 1, wherein the support frame comprises two longitudinal legs and one transverse leg connecting the two longitudinal legs, and the seven-joint-linkage arrangements are each formed having one of the longitudinal legs.

3. The convertible arrangement according to claim 2, wherein a loading bottom is provided and in that the longitudinal legs of the support frame are each guided laterally beside the loading bottom downward towards the corresponding seven-joint-linkage arrangement.

4. The convertible arrangement according to claim 2, wherein the lid element is pivotable to a loading position from the closed position with respect to the support frame and in that a trunk lock is disposed at the transverse leg of the support frame.

5. The convertible arrangement according to claim 1, wherein the adjustment-link arrangements each articulate with a main bearing attached to the vehicle, on the one hand, and to the support frame, on the other hand.

6. The convertible arrangement according to claim 1, wherein the adjustment-link arrangement comprises an articulated-lever arrangement made of two interconnected links.

7. The convertible arrangement according to claim 1, wherein the drive element drives a lid closure, which secures the support frame in the closed position in a locked position and allows a pivoting of the lid element and the support frame to the open position when in an exposed position.

* * * * *